United States Patent [19]
Sextl et al.

[11] Patent Number: 5,316,816
[45] Date of Patent: May 31, 1994

[54] FORM BODY FOR HEAT INSULATION AND VACUUM INSULATION PANEL WITH ASYMMETRIC DESIGN

[75] Inventors: Gerhard Sextl, Geiselbach; Hans Strack, Alzenau; Roland Reuter, Darmstadt; Ilona Fuss, Maintal; Peter Kleinschmit, Hanau; Rudolf Schwarz, Wasserlos, all of Fed. Rep. of Germany

[73] Assignee: Degussa Aktiengesellschaft, Frankfurt, Fed. Rep. of Germany

[21] Appl. No.: 7,129

[22] Filed: Jan. 22, 1993

Related U.S. Application Data

[63] Continuation-in-part of Ser. No. 799,726, Nov. 22, 1991, abandoned, and a continuation-in-part of Ser. No. 719,365, Jun. 24, 1991, abandoned.

[30] Foreign Application Priority Data

Jun. 22, 1990 [DE] Fed. Rep. of Germany ....... 4019870

[51] Int. Cl.$^5$ ............................. B32B 1/06; B32B 5/16
[52] U.S. Cl. ........................................ 428/69; 428/74; 428/75; 428/76; 264/102
[58] Field of Search ...................... 428/68, 69, 75, 76, 428/74; 34/4; 264/102

[56] References Cited

U.S. PATENT DOCUMENTS

| | | | |
|---|---|---|---|
| 2,745,173 | 5/1956 | Janos | 428/74 |
| 3,302,358 | 2/1967 | Jackson | 52/573 |
| 3,790,243 | 2/1974 | Whorton, III | 312/214 |
| 4,159,359 | 6/1979 | Pelloux-Gervais et al. | 428/76 |
| 4,284,674 | 8/1981 | Sheptak | 428/69 |
| 4,359,496 | 11/1982 | Kratel et al. | 428/75 |
| 4,444,821 | 4/1984 | Young et al. | 428/69 |
| 4,546,373 | 10/1985 | Todd et al. | 357/67 |
| 4,594,279 | 6/1986 | Yoneno et al. | 428/69 |
| 4,636,416 | 1/1987 | Kratel et al. | 428/69 |
| 4,681,788 | 7/1987 | Barito et al. | 428/68 |
| 4,726,974 | 2/1988 | Nowobilski et al. | 428/69 |
| 5,032,439 | 7/1991 | Glicksman et al. | 428/44 |
| 5,084,320 | 1/1992 | Barito et al. | 428/69 |

FOREIGN PATENT DOCUMENTS

| | | |
|---|---|---|
| 0254993 | 2/1988 | European Pat. Off. |
| 58-50392 | 3/1983 | Japan |
| 59-77195 | 5/1984 | Japan |
| 61-192993 | 8/1986 | Japan |
| 61-217668 | 9/1986 | Japan |
| 61-241593 | 10/1986 | Japan |
| 61-291466 | 12/1986 | Japan |
| 1268626 | 3/1972 | United Kingdom |

OTHER PUBLICATIONS

European Search Report dated Oct. 4, 1991.
Office Action from EPO Dated Feb. 18, 1992.
(List continued on next page.)

*Primary Examiner*—Alexander S. Thomas
*Attorney, Agent, or Firm*—Beveridge, DeGrandi, Weilacher & Young

[57] ABSTRACT

A shaped body, preferably plate-shaped, for use as heat insulation, formed of (a) a finely distributed, powdery or fibrous substance, (b) a microporous casing, and (c) a gastight and watertight, metal-free casing. The shaped body is produced by drying a powdery or fibrous substance if necessary, optionally placing it into a microporous casing, optionally pressing and then optionally drying. Thereafter, the powdery substance is placed with the microporous casing into a gastight and watertight, metal-free casing. This gastight and watertight casing is optionally evacuated and sealed. Furthermore, a shaped article, preferably plate-shaped, for use as heat insulation, produced from (a) a finely distributed, powdery or fibrous substance with a water absorption capacity of 4 to 50% by weight at 23° C. and 85% relative humidity, (b) a casing of two parts with asymmetric design which contains this finely distributed, powdery or fibrous substance, the first part of the casing being metal-free and concave in such a manner that it is completely filled by the preferably plate-like shaped article and the second part being metal-free or metallic and planar and connected to the trough in such a manner that a gastight and water-vapor-tight seal is assured and both parts having water-vapor-permeabilities between 0 and 0.2 g/m$^2$/d at 23° C. and 85% relative humidity and gas permeabilities for $N_2$, $O_2$ and $CO_2$ of in sum 0 to 0.5 cm$^3$/m$^2$d/bar at 23° C.; the shaped article having the property of absorbing water up to an amount of 2 to 15% by weight without its thermal conductivity deteriorating more than 25%.

19 Claims, 5 Drawing Sheets

OTHER PUBLICATIONS

Office Action from German Patent Office of Feb. 22, 1991.

Office Action from German Patent Office dated Feb. 27, 1991 (and translation).

U.S. patent application 07/652,399.

von Schricker, G., et al., "zum Einfluss mechanishcher Belastsungen auf die Dictigkeit von metallisierten Kunststoffolien und Aluminiumfolienverbundenmit Knuntstoffen" (Comparison of the influence of Mechanical Stresses on the Barrier Properties between Metallized Plastic Films and Aluminum Foil/Plastic Laminates), Verpackungs-Rundschau (Dec. 1990), volume, pp. 45–48, with English language abstract.

Hinsken, H., "kuststoff-Verbundfolienin der Verpackung-eine Ubersicht", Kunststoffe (Dec. 1987), vol. 5, pp. 461–471 (with English language abstract attached).

FORM BODY FOR HEAT INSULATION AND VACUUM INSULATION PANEL WITH ASYMMETRIC DESIGN

REFERENCE TO RELATED APPLICATIONS

The present application is a continuation-in-part of our copending U.S. patent application Ser. No. 07/799,726 (filed on Nov. 22, 1991 now abandoned) and a continuation-in-part of Ser. No. 07/719,365 (filed on Jun. 24, 1991 now abandoned), which are incorporated by reference in their entirety.

INTRODUCTION AND BACKGROUND

The present invention relates to a shaped body, preferably plate-shaped, for use as heat insulation. The present invention also relates to methods of making shaped heat insulation products.

The production of heat insulation plates or flat, level heat insulation bodies based on precipitated silica which are evacuated and provided with a multi-layer casing is known.

Thus, EP-A 0 190 582 and EP-A 0 254 993 describe a casing of compound films which additionally contain a metal film of for example aluminum. These films should be airtight and watertight.

EP-B 0 164 006 describes heat insulation plates which contain fine metal oxides and are evacuated. The casing material can be a compound film with a layer sequence of thermoplastic material/metal film/thermoplastic material.

Published Japanese Patent Application Sho 62-207 777 describes heat insulators which are produced by dispensing perlite or other readily porous materials into a container of hot-sealable plastic laminate and then evacuating the interior of this container.

Hot-sealed, heat-insulating elements consist of plastic laminate 25/m thick with a water-vapor permeability of 1.0 g/m$^2$.d at 38° C. and 90% relative humidity as well as an oxygen permeability of 2.0 cm$^3$/m$^2$.d at 23° C. and 90% relative humidity. The laminates consist of vinylidene chloride—vinyl chloride copolymer which is vapor-deposited on at least one side with a layer of aluminum 100 to 1000 angstroms thick. At least one laminate layer is used.

The known usage of metal-coated compound films has the disadvantage that heat can be conducted parallel to the film surface, which results when used in insulation materials in undesired thermal bridges on the edges of a heat insulation body between the cold side and the warm side.

The disadvantageous influence on the total thermal conductivity of a heat insulation body associated therewith is not detected in the measurement of thermal conductivity according to the absolute one-plate method with protective ring technology according to Kohlrausch (F. Kohlrausch: "Praktische Physik", vol. 1, 22d edit., B. G. Teubner Verlag, Stuttgart, 1968, p. 375 ff).

A heat insulation body manufactured in accordance with EP-A 0 190 582 using a film containing metal exhibits a thermal conductivity of 8 mW/(m.K), measured in accordance with the above-named method. If a measuring arrangement without protective ring is selected, the thermal conductivity rises, as a function of the geometry and size of the form body and of the thickness of the metal layer in the casing film, to values which are in part considerably higher. The insulating performance of the total heat insulation body thus also depends decisively on whether the casing film used in the productions contains metal or not.

There is thus the problem of producing heat insulation bodies which exhibit a low thermal conductivity both transversally as well as also longitudinally to the course of the compound film.

SUMMARY OF THE INVENTION

An object of the invention is to provide a shaped body, preferably plate-shaped, for use as heat insulation product, produced from (a) a finely distributed, powdery or fibrous substance with a water absorption capacity of 4 to 50% by weight at 23° C. and 85% relative humidity, and (b) a metal-free casing which encases this finely distributed, powdery or fibrous substance and exhibits a water-vapor permeability of 0.1 to 0.5 g/(m$^2$.d) at 23° C. and 85% relative humidity and gas permeabilities of 0.1 to 0.5 cm$^3$/(m$^2$.d.bar) at 23° C.

It is a feature of the invention that the product has the property of absorbing water up to an amount of 2 to 15% by weight without deteriorating more than 25% in thermal conductivity.

In a preferred embodiment the microporous casing which contains the finely distributed, powdery or fibrous substance in a pressed and dried state can be brought into the metal-free casing.

The form body of the invention can be produced by (a) Optionally drying a finely distributed, powdery or fibrous substance exhibiting a water absorption capacity of 4 to 50% by weight (at 23° C. and 85% relative humidity) under conditions which suffice for expelling the surface water, (b) Optionally pressing the powdery or fibrous substance, (c) Bringing the optionally dried and optionally pressed powdery or fibrous substance into a metal-free casing exhibiting an opening for evacuation and a water-vapor permeability of 0.1 to 0.5 g/(m$^2$.d) (at 23° C. and 85% relative humidity) and gas permeabilities of 0.1 to 0.5 cm$^3$/(m$^2$.d.bar) (at 23° C.), (d) Evacuating the metal-free casing and (e) Sealing the evacuation opening of the metal-free casing while retaining the vacuum in the interior of the casing.

In a preferred embodiment of the method of the invention, the finely distributed, powdery or fibrous substance can be dried in a microporous casing.

In an especially preferred embodiment of the method of the invention, the finely distributed, powdery or fibrous substance can be pressed in a microporous casing and optionally dried thereafter.

The drying of the finely distributed, powdery or fibrous substance can take place in a preferred embodiment of the invention by means of microwaves.

A film or a non-woven material consisting of e.g. polypropylene, polyester or filter paper can be used as microporous casing, which has the function in principle of holding the finely divided, powdery substance together during the drying and pressing. Thermoplastic films as above noted can be used.

In general, a film or a material can be used for this purpose which lets gases (e.g. air) and moisture through and retains the fine, powdery substance.

Another object of the present invention is to provide heat insulators which have long service life and, moreover, do not permit heat bridges between the cold and warm sides because of metallic components or casings at the edges.

In accordance with the present invention, these and other objects are achieved by a preferably plate-like shaped article for use as heat insulation, manufactured from:

a) a finely distributed, powdery or fibrous substance which has a water-absorption capacity of 4 to 50% by weight at 23° C. and 85% relative humidity, and b) a casing of two parts with asymmetric design which contains this finely distributed, powdery or fibrous substance. This first part of the casing is metal-free and is concave in such a manner that it is completely filled by the preferably plate-like form body. The second part ("cover") can be metal-free or metallic and planar and is connected to the trough in such a manner that a gastight and water-vapor-tight seal is assured. Both parts have water-vapor permeabilities between 0 and 0.2 $g/m^2/d$ at 23° C. and 85% relative humidity and gas permeabilities for $N_2$, $O_2$ and $CO_2$ of, in sum, 0 to 0.5 $cm^3/m^2/d/bar$ at 23° C.

The shaped article (casing with asymmetric design) of the invention has the property of absorbing water up to an amount of 2 to 15% by weight without this impairing its heat conductivity by more than 25%.

A casing with asymmetric design has the advantage that metallic foils can also be used as cover films (the second part of the casing) which foils have very low water-vapor permeabilities between 0 and 0.2 $g/m^2/d$ at 23° C. and 85% relative humidity and low gas permeabilities for $N_2$, $O_2$ and $CO_2$ of in sum between 0 and 0.5 $cm^3/m^2d/bar$ at 23° C. without heat bridges being able to occur between the planar foils so that the service life of the heat insulation bodies can again be clearly extended.

The heat insulation shaped article (casing with asymmetric design) of the invention can be evacuated. The interior pressure is preferably approximately 1 mbar.

The tapped density of the finely distributed substance contained in the heat insulation form bodies can be 40 to 200 g/l preferably 50 to 120 g/l.

The finely distributed, powdery or fibrous substance can be pressed in a microporous casing.

The finely distributed, powdery or fibrous substance can be dried in a microporous casing.

In a preferred embodiment, the microporous casing containing the finely distributed, powdery or fibrous substance in a pressed and dried state can be brought into the two-part casing with asymmetric design and a metallic foil is preferably used as cover foil.

The shaped article of the invention (casing with asymmetric design) can be manufactured by:

a) optionally drying a finely distributed, powdery or fibrous substance exhibiting a water absorption capacity of 4 to 50% by weight (at 23° C. and 85% relative humidity) under conditions which suffice for removal of surface water, b) optionally pressing the powdery or fibrous substance, for which a press mold can optionally be used, c) bringing the optionally dried and optionally pressed powdery or fibrous substance into the concave (deep-drawn) metal-free part of the casing, which has a water-vapor permeability Of 0.02 to 0.2 $g/m^2/d$ at 23° C. and 85% relative humidity and gas permeability for $N_2$, $O_2$ and $CO_2$ of in sum 0.05 to 0.5 $cm^3/m^2/d/bar$ at 23° C., d) evacuating the optionally dried and optionally pressed powdery or fibrous substance in the concave (deep-drawn) part of the casing to a pressure between 0.1 and 1 mbar, e) connecting the second metal-free or metallic and plane part of the casing, which has a water-vapor permeability of 0 to 0.2 $g/m^2/d$ at 23° C. and 85% relative humidity and gas permeabilities for $N_2$, $O_2$ and $CO_2$ of, in sum, 0 to 0.5 $cm^3/m^2/d/bar$ at 23° C., in a vacuum to the first metal-free casing part in such a manner that the vacuum remains preserved in the interior of the casing and a closure is produced which is gastight and water-vapor-tight to the extent possible.

In a preferred embodiment of the method of the invention the two-part casing with asymmetric design can be evacuated in the range between 0.1 and 1 mbar. In a further preferred embodiment of the method of the invention the finely distributed, powdery or fibrous substance can be dried in a microporous casing. In an especially preferred embodiment of the method of the invention the finely distributed, powdery or fibrous substance can be pressed in a microporous casing and optionally dried thereafter.

BRIEF DESCRIPTION OF THE DRAWINGS

The present invention will be further understood with reference to the drawings, wherein.

DETAILED DESCRIPTION OF THE INVENTION

In principle, any substance can be used as a finely distributed, powdery substance whose chemical properties do not change in the course of time and which exhibits a water absorption capacity of 4–50% by weight at 23° C. and 85% relative moisture.

The amount of water which the shaped insulation body of the invention may absorb corresponds to the amount of water at which the thermal conductivity of the shaped insulation body is elevated by not more than 25%. The water content of the shaped insulation body which is admissible in this sense is 2 to 15% by weight and is generally lower than the water absorption capacity of the powdery substance used to produce the shaped insulation body.

In a preferred embodiment the admissible amount of water in the shaped insulation body can be 5 to 12% by weight, especially 6 to 7% by weight.

The amount of gas which may permeate into the heat insulating shaped article of the invention corresponds to the amount of gases (such as e.g., $N_2$, $O_2$ and $CO_2$) at which the heat conductivity is elevated by not more than 25%.

The inner pressure in the heat insulation shaped article which is permissible in this sense is a maximum of 20 mbars at an initial pressure of 1 mbar.

A finely distributed silicon dioxide material is preferred, produced by reacting an alkali water glass and a mineral acid in order to precipitate the silicon dioxide, which is used alone or in a mixture with other silicas or powdery substances.

Such precipitation silicas are described e.g. in "Ullmann's Enzyklopädie der technischen Chemie", 4th edition, volume 21, page 462 ff.

Precipitation silicas which were dried according to industrially conventional methods (e.g. with a spray drier, rack drier, drum type drier) and ground (e.g. with a cross-flow mill, pinned disk mill, air-jet mill or vapor-jet mill) are especially suitable.

Such precipitation silicas can be obtained e.g. under the following designations: Sipernat 22 S, Sipernat 22 LS, Sipernat 50 S, FK 500 LS, FK 500 DS, FK320 DS, FK 310, FK 700 DS.

In particular, precipitation silicas are used which were spray-dried and ground.

Such precipitation silicas are commercially available under the designation FK 500 LS, FK 500 DS or Sipernat 22 LS.

Other suitable precipitated silicas are described in U.S. Pat. NO. 4,495,167 (Degussa).

The following substances or combinations of substances can also be used (possibly after mixing with organic or inorganic fiber materials such as glass fibers, ceramic fibers or plastic fibers for the mechanical stabilization of the heat insulation bodies):

Mixtures of various precipitated silicas such as e.g. Sipernat 22 LS and FK 500 LS, Sipernat 22 LS and FK 320 DS, FK 500 LS and FK 320 DS, FK 500 LS and FK 500 DS, FK 500 LS and FK 700 DS, FK 700 DS and FK 300.

Mixtures of precipitated and pyrogenic silicas such as e.g. Sipernat 22 LS, FK 320 DS, FK 310, FK 700 DS and/or FK 500 LS with Aerosil A 200 and/or Aerosil A 300.

Mixtures of precipitated silicas and silica gels such as Sipernat 22 LS, FK 320 DS and/or FK 500 LS with silica gels (e.g. the types Syloid 72 and Syloid 244 sold by W. R. Grace, Worms, Germany).

Mixtures of precipitated silicas and mineral substances such as e.g. Sipernat 22 LS, FK 320 DS and/or FK 500 LS with perlites, kaolinite, montmorillonite, mica and/or calcium sulfate (gypsum).

Mixtures of precipitated silicas and ground glasses or vitreous substances such as e.g. Sipernat 22 LS, FK 320 DS, FK 500 DS, and/or FK 500 LS with glass powder and/or very fine glass wool.

Mixtures of precipitated silicas and carbon blacks such as e.g. Sipernat 22 LS, FK 320 DS, FK 500 DS, and/or FK 500 LS with furnace carbon blacks, flame carbon blacks and/or gas carbon blacks.

Mixtures of precipitated silicas and synthetic or natural silicate substances such as e.g. Sipernat 22 LS, FK 320 DS, FK 500 DS, and/or FK 500 LS with synthetic or natural zeolites or aluminum silicates or other silicate substances (calcium silicate, diatomaceous earth, Extrusil).

Mixtures of precipitated silicas and synthetic waste substances such as e.g. Sipernat 22 LS, FK 320 DS, FK 500 DS and/or FK 500 LS with flue dusts, power-plant ashes, ashes from all types of combustion systems.

Mixtures of precipitated silicas and non-metallic elements such as e.g. Sipernat 22 LS, FK 320 DS, FK 500 DS, and/or FK 500 LS with sulfur and/or ground coal.

Mixtures of precipitated silicas and fibers such as e.g. Sipernat 22 LS, FK 320 DS, FK 500 DS, and/or FK 500 LS with inorganic or organic fibers (viscose staple rayon fiber or fine plastic fibers of any type).

Mixtures of precipitated silicas such as e.g., Sipernat 22 LS, FK 320 DS, FK 500 LS and/or FK 500 DS and powdery organic superabsorbers such as e.g., polyacrylates.

Mixtures of precipitated silicas and pyrogenic metal oxides such as e.g. Sipernat 22 LS, FK 320 DS, FK 500 DS, and/or FK 500 LS with pyrogenic aluminum oxide, iron oxide and/or titanium dioxide.

Pyrogenic silicas such as e.g. A 200, A 300, A 380, A 450, OX 50, specially pretreated Aerosils, Aerosil MOX types, Aerosil COK 84.

Mixtures of various pyrogenic silicas such as e.g. A 200 or A 300 with specially pretreated Aerosil types.

Mixtures of pyrogenic silicas and silica gels such as e.g. A 200 and/or A 300 with silica gels (e.g. the types Syloid 72 and Syloid 244 of W. R. Grace).

Mixtures of pyrogenic silicas and mineral substances such as e.g. A 200 and/or A 300 with perlites, kaolinite, montmorillonite, mica and/or calcium sulfate (gypsum).

Mixtures of pyrogenic silicas and ground glasses or vitreous substances such as e.g. A 200 and/or A 300 with glass powder and/or very fine glass wool. Mixtures of pyrogenic silicas and carbon blacks such as e.g. A 200 and/or A 300 with furnace carbon blacks, flame carbon blacks and/or gas carbon blacks.

Mixtures of pyrogenic silicas and synthetic or natural silicate substances such as e.g. A 200 and/or A 300 with synthetic or natural zeolites or aluminum silicates or other silicate substances (calcium silicate, diatomaceous earth, Extrusil).

Mixtures of pyrogenic silicas and synthetic waste substances such as e.g. A 200 and/or A 300 with flue dusts, power-plant ashes, ashes from all types of combustion systems.

Mixtures of pyrogenic silicas and non-metallic elements such as e.g. A 200 and/or A 300 with sulfur and/or ground coal.

Mixtures of pyrogenic silicas and fibers such as e.g. A 200 and/or A 300 with inorganic or organic fibers (viscose rayon staple fiber or fine plastic fibers of any type).

Mixtures of pyrogenic silicas such as e.g., Aerosil 200 and/or Aerosil 300 and powdery organic superabsorbers such as e.g., polyacrylates.

Mixtures of pyrogenic silicas and pyrogenic metal oxides such as e.g. A 200 and/or A 300 with pyrogenic aluminum oxide, iron oxide, titanium dioxide.

Mixtures of carbon blacks and silica acid gels such as e.g. carbon blacks or carbon-black mixtures with silica gels (e.g. the types Syloid 72 and Syloid 244 of W. R. Grace).

Mixtures of carbon blacks and mineral substances such as e.g. carbon blacks or carbon-black mixtures with montmorillonite and/or calcium sulfate (gypsum).

Mixtures of carbon blacks and synthetic or natural silicate substances such as e.g. carbon blacks or carbon-black mixtures with synthetic or natural zeolites or aluminum silicates or other silicate substances (calcium silicate, diatomaceous earth, Extrusil).

Mixtures of carbon blacks and powdery organic superabsorbers such as e.g., polyacrylates.

Mixtures of carbon blacks and pyrogenic metal oxides such as e.g. carbon blacks or carbon-black mixtures with pyrogenic aluminum oxide, iron oxide, titanium dioxide.

Zeolites (zeolitic molecular sieves) such as e.g. zeolite A, zeolite X, zeolite Y, pretreated zeolites.

Mixtures of various zeolites such as e.g. zeolite X with zeolite Y.

Mixtures of zeolites and silica acid gels such as e.g. zeolites or zeolite mixtures with silica gels (e.g. the types Syloid 72 and Syloid 244 of W. R. Grace).

Mixtures of zeolites and mineral substances such as e.g. zeolites or zeolite mixtures with perlites, kaolinite, montmorillonite, mica and/or calcium sulfate (gypsum).

Mixtures of zeolites and ground glasses or vitreous substances such as e.g. zeolites or zeolite mixtures with glass powder and/or very fine glass wool.

Mixtures of zeolites and synthetic or natural silicate substances such as e.g. zeolites or zeolite mixtures with synthetic aluminum silicates or other silicate substances (calcium silicate, diatomaceous earth, Extrusil).

Mixtures of zeolites and synthetic waste substances such as e.g. zeolites or zeolite mixtures with flue dusts, power-plant ashes, ashes from all types of combustion systems.

Mixtures of zeolites and non-metallic elements such as e.g. zeolites or zeolite mixtures with sulfur and/or ground coal.

Mixtures of zeolites and fibers such as e.g. zeolites or zeolite mixtures with inorganic or organic fibers (viscose rayon staple fiber or fine plastic fibers of any type).

Mixtures of zeolites and powdery organic superabsorbers such as e.g., polyacrylates.

Mixtures of zeolites and pyrogenic metal oxides such as e.g. zeolites or zeolite mixtures with pyrogenic aluminum oxide, iron oxide, titanium dioxide.

Silica gels such as e.g. Syloid 72 (W. R. Grace), Syloid 244 (W. R. Grace).

Mixtures of various silica gels such as e.g. Syloid 72 with Syloid 244 (Grace company, Worms), differently pretreated silica gels.

Mixtures of silica gels and mineral substances such as e.g. silica gels or silica gel mixtures with perlites, kaolinite, montmorillonite, mica and/or calcium sulfate (gypsum).

Mixtures of silica gels and ground glasses or vitreous substances such as e.g. silica gels or silica gel mixtures with glass powder and/or very fine glass wool.

Mixtures of silica gels and synthetic or natural silicate substances such as e.g. silica gels or silica gel mixtures with synthetic aluminum silicates or other silicate substances (calcium silicate, diatomaceous earth, Extrusil).

Mixtures of silica gels and synthetic waste substances such as e.g. silica gels or silica gel mixtures with flue dusts, power-plant ashes, ashes from all types of combustion systems.

Mixtures of silica gels and non-metallic elements such as e.g. silica gels or silica gel mixtures with sulfur and/or ground coal.

Mixtures of silica gels and fibers such as e.g. silica gels or silica gel mixtures with inorganic or organic fibers (viscose rayon staple fiber or fine plastic fibers of any type).

Mixtures of silica gels and powdery organic superabsorbers such as e.g., polyacrylates.

Mixtures of silica gels and pyrogenic metal oxides such as e.g. silica gels or silica gel mixtures with pyrogenic aluminum oxide, iron oxide, titanium dioxide.

Mixtures of various aluminum silicates such as e.g. various aluminum silicate types, differently pretreated aluminum silicates.

Mixtures of aluminum silicates and mineral substances such as e.g. aluminum silicates or aluminum silicate mixtures with perlites, kaolinite, montmorillonite, mica and/or calcium sulfate (gypsum).

Mixtures of aluminum silicates and ground glasses or vitreous substances such as e.g. aluminum silicates or aluminum silicate mixtures with glass powder and/or very fine glass wool.

Mixtures of aluminum silicates and synthetic or natural silicate substances such as e.g. aluminum silicates or aluminum silicate mixtures with other silicate substances (calcium silicate, diatomaceous earth, Extrusil).

Mixtures of aluminum silicates and synthetic waste substances such as e.g. aluminum silicates or aluminum silicate mixtures with flue dusts, power-plant ashes, ashes from all types of combustion systems.

Mixtures of aluminum silicates and non-metallic elements such as e.g. aluminum silicates or aluminum silicate mixtures with sulfur and/or ground coal.

Mixtures of aluminum silicates and fibers such as e.g. aluminum silicates or aluminum silicate mixtures with inorganic or organic fibers (viscose rayon staple fiber or fine plastic fibers of any type).

Mixtures of aluminum silicates and powdery organic superabsorbers such as e.g., polyacrylates.

Mixtures of aluminum silicates and pyrogenic metal oxides such as e.g. aluminum silicates or aluminum silicate mixtures with pyrogenic aluminum oxide, iron oxide, titanium dioxide.

Metal oxides (pyrogenic or precipitated) such as e.g. aluminum oxide iron oxides, titanium dioxide, zirconium dioxide.

Mixtures of various metal oxides (pyrogenic or precipitated) such as e.g. aluminum oxide with various iron oxides, aluminum oxide with titanium dioxide, titanium dioxide with various iron oxides.

Mixtures of metal oxides (pyrogenic or precipitated) and mineral substances such as e.g. aluminum oxide, various iron oxides, titanium dioxide and/or zirconium dioxide with perlites, kaolinite, montmorillonite, mica and/or calcium sulfate (gypsum).

Mixtures of metal oxides (pyrogenic or precipitated) and ground glasses or vitreous substances such as e.g. aluminum oxide, various iron oxides, titanium dioxide and/or zirconium dioxide with glass powder and/or very fine glass wool.

Mixtures of metal oxides (pyrogenic or precipitated) and synthetic or natural silicate substances such as e.g. aluminum oxide, various iron oxides, titanium dioxide and/or zirconium dioxide with silicate substances (calcium silicate, diatomaceous earth, Extrusil).

Mixtures of metal oxides (pyrogenic or precipitated) and synthetic waste substances such as e.g. aluminum oxide, various iron oxides, titanium dioxide and/or zirconium dioxide with flue dusts, power-plant ashes, ashes from all types of combustion systems.

Mixtures of metal oxides (pyrogenic or precipitated) and non-metallic elements such as e.g. aluminum oxide, various iron oxides, titanium dioxide and/or zirconium dioxide with sulfur and/or ground coal.

Mixtures of metal oxides (pyrogenic or precipitated) and fibers such as e.g. aluminum oxides, various iron oxides, titanium dioxide and/or zirconium dioxide with inorganic or organic fibers (viscose rayon staple fiber or fine plastic fibers of any type).

Mixtures of metal oxides such as e.g., aluminum oxides, various iron oxides, titanium dioxide and/or zirconium dioxide (pyrogenic or precipitated) and powdery organic superabsorbers such as e.g., polyacrylates.

In addition, the following can be used as precipitated silicas:

HISIL T 600, HISIL T 690 of the PPG company

Tixosil 333 of the Rhône-Poulenc company
Hoesch SM 614 of the AKZO company
Zeothix 265 and Zeothix 177 of the Huber company.

The casings consisting of two parts with asymmetric design, which can be used in accordance with the invention, can exhibit on the one hand, in the area of the metal-free and concave (deep-drawn) casing, a water vapor permeability of 0.02 to 0.2 $g/m^2/d$ at 23° C. and 85% relative humidity and gas permeabilities for $N_2$, $O_2$ and $CO_2$ of, in sum, 0.05 to 0.5 $cm^3/m^2/d/bar$. On the other hand, in the area of the metallic and planar cover, it has a water vapor permeability of 0 to 0.2 $g/m^2/d$ at 23° C. and 85% relative humidity and gas permeabilities for $N_2$, $O_2$ and $CO_2$ of in sum 0 to 0.5 $cm^3/m^2/d/bar$ at 23° C. The gas permeabilities are such that the inner pressure in the heat insulator does not exceed 20 mbars to the end of its service life. Since the gas permeabilities are lower by a factor of approximately 1000 in comparison to the water vapor permeability, the maximum service life of the heat insulator is reached when a further absorption of water vapor by the filler is no longer possible or the heat conductivity sharply rises upon a further absorption of water vapor. The metal-free casing which can be used in accordance with the invention can preferably be a multilayer film which can be constructed as follows:

| | |
|---|---|
| LLPDE | Linear polyethylene |
| HV | adhesive agent |
| EVOH | ethylene - vinyl alcohol copolymerizate |
| HV | adhesive agent |
| LLPDE | linear polyethylene |
| PVDC | polyvinylidene chloride |

In particular, the multilayer film can be constructed as follows (Example 1):

| | |
|---|---|
| LLDPE | linear polyethylene, thickness 65/m, specific gravity 0.92 $g/cm^3$ |
| HV | adhesive agent, thickness 5/m, specific gravity 0.92 $g/cm^3$ |
| EVOH | ethylene - vinyl alcohol copolymerizate, thickness 10/m, specific gravity 1.17 $g/cm^3$ |
| HV | adhesive agent, thickness 5/m, specific gravity 0.92 $g/cm^3$ LLDPE linear polyethylene, thickness 65/m, specific gravity 0.92 $g/cm^3$ |
| PVDC | polyvinylidene chloride, thickness 12/m, specific gravity 1.34 $g/cm^3$ |

The metallic casing ("cover") which can be used in accordance with the invention (casing with asymmetric design) can preferably be a multilayer film which can be constructed as follows:
Polyester
HV
Al foil
HV
Polyethylene In particular, the multilayer film (cf. H. Hinksen, Kunststoffe 77 (1987/5) can be constructed as follows (Example 2):

| | |
|---|---|
| PETP | polyethylene terephthalate thickness 12/m specific gravity 1.37 $g/cm^3$ |
| HV | adhesive agent, thickness 5/m specific gravity 0.92 $g/cm^3$ |

| | |
|---|---|
| Al foil | aluminum foil thickness 9/m specific gravity |
| HV | adhesive agent thickness 5/m specific gravity 0.92 $g/cm^3$ |
| PE | polyethylene thickness 75/m specific gravity 0.92 $g/cm^3$ |

The casings which can be used in accordance with the invention can be known films or multi-layer films like those described e.g. in: H. Hinsken, Compound Plastic Foils in Packaging—A Survey, Kunststoffe 77 (1987), page 461 ff; M. Boysen, Barrier Plastics for Packagings by Way of Comparison, Kunststoffe 77, (1987), page 522 ff. These references are incorporated by reference and describe suitable synthetic thermoplastic sheets, films and films of appropriate permeability.

The metal-free casing can exhibit a water-vapor permeability of 0.1 to 0.5 $g/m^2.d$, 23° C. and 85% relative moisture. The permeabilities for other gases (e.g. $O_2$, $O_2$, $CO_2$ ) must not be greater in sum than 0.5 $cm^3/(m^2.d.bar)$ at 23° C. The gas permeabilities are thus lower by a factor of approximately 1000 in comparison to the water-vapor permeability (0.5 $g/(m^2.d)$ water corresponds approximately to a volume of 600 $cm^3/(m^2.d)$ of water vapor) and can therefore be disregarded.

Finely distributed, powdery or fibrous substances which exhibit a water absorption capacity of 4 to 50% by weight (at 23° C. and 85% relative moisture) are suitable for the insulation bodies of the invention. The amount of water which the finely distributed substances may absorb when used in the insulation products of the invention is as a rule less than their water absorption capacity. The limiting value for the permissible water absorption in the heat insulation body corresponds to the amount of water at which the thermal conductivity of the insulation body has increased by not more than 25% in relation to a dry insulation body. In order to produce a dry form body, a finely distributed substance is used which was dried according to DIN (German Industrial Standard) 55 921. The corresponding amount of water which a heat insulation body may absorb is preferably between 2 and 15% by weight relative to the dry filler.

The heat insulation bodies of the invention have the advantage over conventional heat insulation bodies that as a result of the use of metal-free casing films, the heat conductivity in the edge area of the heat insulation bodies is so low that the very good total thermal conductivity of the insulation bodies of approximately 8 mW/(m.K) (measured according to the absolute one-plate method with a protective ring on heat insulators produced from the precipitation silica FK 500 LS) is impaired only to an inconsiderable extent.

Thus, containers, for example, can be manufactured from the heat insulation bodies of the invention which are suitable for the storage and/or transport of temperature-sensitive items (examples are disposable transport containers for temperature-sensitive medicaments or vaccines). Furthermore, insulating layers for the insulation of refrigerators and freezers can be manufactured from the heat insulation bodies (casing with asymmetric design) of the invention.

The following table lists examples for the thermal conductivities of heat insulation bodies which were manufactured with metal-containing and metal-free casing film. The thermal conductivities were measured in each instance according to the absolute one-plate method with protective ring and according to a method without protective ring technology. In the method without protective ring technology, thermal currents which flow through the casing film from one side of a plate-like heat insulation body to the other are not compensated and a value is obtained for the total thermal conductivity of the heat insulation body (dependent on the geometry and the size of the form body).

Filling material: FK 500 LS
Dimensions: 250 mm × 250 mm × 20 mm

Thermal conductivities of various heat insulation bodies as a function of the measuring method at 23° C.

| Type of heat insulation body | Thermal conductivity according to the absolute one-plate method with protective ring | according to the one-plated method without protective ring |
|---|---|---|
| Heat insulation body with metal-containing casing | 8 mW/(m.K) | approx. 25 mW/(m.K) |
| Heat insulation bosy with metal-free casing according to the invention | 8 mW/(m.K) | approx. 9 mW/(m.K) |

The following table lists examples for the heat conductivities of heat insulation bodies which were manufactured with a metal-free casing film or casings with asymmetric design. The heat conductivities were measured in each instance according to the absolute one-plate method with protective ring and according to a method without protective ring technology. In the method without protective ring technology, thermal currents which flow through the casing film from one side of a plate-like heat insulation body to the other are not compensated and a value is obtained for the total heat conductivity of the heat insulation body (dependent on the geometry and the size of the shaped article).

Filling material: FK 500 LS
Dimensions: 250 mm × 250 mm + 20 mm

Heat conductivities of various heat insulation bodies as a function of the measuring method (average temperature: approximately 0° C.)

| Type of heat insulation body | Measuring method for determining the heat conductivity | |
|---|---|---|
| | according to the absolute one-plate plate method with protective ring | according to the one plate method without protective ring |
| Heat insulation body with metal-free casing or casings in accordance with the invention with asymmetric design | 8 mW/(m.K) | approx. 9 mW/(m.K) |

The powdery or fibrous substances used in accordance with the invention are characterized e.g. by the following physico-chemical data according to tables 1, 2, 3 and 4:

| | | AEROSIL 200 | AEROSIL 300 | AEROSIL 380 | AEROSIL OX 50 | AEROSIL COX 84 |
|---|---|---|---|---|---|---|
| Surface according to BET | m²/g | 200 ± 25 | 300 ± 30 | 300 ± 30 | 50 ± 15 | 170 ± 30 |
| Average size of the primary particles | Nanometer | 12 | 7 | 7 | 40 | — |
| Stamping density 1) | g/l | ca. 50 | ca. 50 | ca. 50 | ca 130 | ca. 50 |
| Drying loss 2) (2 h at 1-5° C.) upon leaving the plant | % | <1.5 | <1.5 | <1.5 | <1.5 | <1.5 |
| Annealing loss 2) 7) (2 h at 1000° C.) | % | <1 | <2 | <2.5 | <1 | <1 |
| pH 3) (in 4% aqueous dispersion) | | 3.6–4.3 | 3.6–4.3 | 3.6–4.3 | 3.8–4.5 | 3.6–4.3 |
| $SiO_2$ 5) | % | >99.8 | >99.8 | >99.8 | >99.8 | 82–86 |
| $Al_2O_3$ 5) | % | <0.05 | <0.05 | <0.05 | <0.08 | 14–18 |
| $Fe_2O_2$ 5) | % | <0.003 | <0.003 | <0.003 | <0.01 | <0.1 |
| $TiO_2$ 5) | % | <0.03 | <0.03 | <0.03 | <0.03 | <0.03 |
| HCl 5) 10) | % | <0.025 | <0.025 | <0.025 | <0.01 | <0.1 |
| Sieve tailings 4) according to Mocker (45μ) | % | <0.05 | <0.05 | <0.05 | <0.1 | <0.1 |

1) according to DIN 52 194
2) according to DIN 55 921
3) according to DIN 53 200
4) according to DIN 53 580
5) relative to the substance anealed 2 hours at 1000° C.
7) relative to the substance dried 2 hours at 105° C.
10) HCl content is component of the annealing loss

| | | EXTRUSIL |
|---|---|---|
| Surface according to BET 1 | m²/g | 35 |
| Average size of the aggolmeratates of table.) | m | 5 8) |
| Stamping density 2) | g/l | 300 |
| Drying loss (2 h at 105° C.) upon leaving the plant 3) | % | 6 |
| Annealing loss (2 h at 1000° C.) 4) 10) | % | 7 |
| pH (in 5% aqueous dispersion) 5) | | 10 |
| DHP absorption 6) 10) | g/100 g | 160 |
| $SiO^2$ 11) | % | 91 |
| $Al_2O^2$ 11) | % | 0,2 |
| CaO 11) | % | 6 |
| $Na_2/O$ 11) | % | 2 |
| $Fe_2O_3$ 11) | % | 0,03 |
| $SO_3$ 11) | % | — |
| $Cl^-$ 11) | % | 0,8 |
| Sieve tailings (according to mocker, 45μ) 7) | % | 0,2 |

1) according to DIN 66 131
2) according to DIN ISO 787/XI, JIS K 5101/78 (non-sieved)
3) according to DIN ISO 787-II, ASTM D 280, JIS K 5101/21
4) according to DIN 55 921, ASTM D 1208, JIS K 5101/23
5) according to DIN ISO 787/IX, ASTM D 1208, JIS K 5101/24
6) according to DIN 53 601, ASTM D 2414
7) according to DIN ISO 787/xviii, JIS 5101/20
8) coulter counter, 100 m capillary
10) relative to the substance dried 2 hours at 105° C.
11) relative to the substance annealed 2 hours at 1000° C.

|  |  | FK 320 DS | FK 500 LS | SIPERNAT 22 LS |
|---|---|---|---|---|
| Surface according to BET1) | m²/g | 170 | 450 | 190 |
| Average size of the agglomerates | μm | 4 9) | 3.5 9) | 4.5 9) |
| Stamping density 2) | g/l | 80 | 80 | 80 |
| Drying loss (2 h at 105° C.) upon leaving the plant 3) | % | 6 | 3 | 6 |
| Annealing loss (2 h at 1000° C.) 4) 10) | % | 5 | 5 | 5 |
| pH (in 5% aqueous dispersion) 5) |  | 6.3 | 6.5 | 6.3 |
| DBP absorption 6) 10) | g/100 g | 230 | 330 | 270 |
| SiO₂ 11) | % | 98 | 98.5 | 98 |
| Na₂O 11) | % | 1 | 0.6 | 1 |
| Fe₂O₃ 11) | % | 0.03 | 0.03 | 0.03 |
| SO₃ 11) | % | 0.8 | 0.7 | 0.8 |
| Sieve tailings (according to Mocker, 45μ) 7) | % | 0.01 | 0.02 | 0.1 |

1) according to DIN 66 131
2) according to DIN ISO 787/XI, JIS K 5101/78 (non-sieved)
3) according to DIN ISO 787/II, ASTM D 280, JIS K 5101/21
4) according to DIN 55 921, ASTM D 1208, JIS K 5101/23
5) according to DIN ISO 787/IX, ASTM D 1208, JIS K 5101/24
6) according to DIN 53 601, ASTM D 2414
7) according to DIN ISO 787/XVIII, JIS K 5101/20
9) Coutler counter, 60 μm capillary
10) relative to the substance dried 2 hours at 105° C.
11) relative to the substance annealed 2 hours at 1000° C.

| Manufacturer | | HOESCH | HUBER | | PPG | | RHONE POULENC | GRACE | |
|---|---|---|---|---|---|---|---|---|---|
| Type | | SM 614 | Zeothix 265 | Zeothix 177 | Hisil T 600 | Hisil T 690 | Tixosil 333 | Syloid 72 | Syloid 244 |
| SiO₂ content 1) | (%) | 87 | — | — | — | — | 97 | 99 | 99.5 |
| Drying loss 2) | (%) | 6 | 7 | — | 1-2 | 10 | — | 1 | 4 |
| Annealing loss 2) | (%) | 9 | — | — | — | — | +/−11 | 5 | 7 |
| pH 3) |  | — | — | — | — | — | — | — | — |
| BET surface | (m²/g) | — | 260 | 175 | 200 | 150 | 300 | — | — |
| Average particle size 4) | (m) | 8 | 1.7 | 1.5 | 0.015 | 0.021 | 2.3 | 4 | 2 |
| Oil absorption | (ml/100 g) | — | 220 | 235 | — | — | 370 | — | — |
| Wet sieve oversize 5) | (%) | — | — | — | — | — | — | 0.02 | 0.02 |
| Pore volume | (ml/g) | — | — | — | — | — | — | 1.2 | 1.6 |
| Type |  | FK 6) | FK 6) | FK 6) | FK 6) | FK 6) | FK 6) | KG 7) | KG 7) |

1) relative to substance annealed at 1000° C.
2) DIN 55 921
3) DIN 53 200
4) Coulter aounter 100 μm capillary
5) according to Mocker
6) Precipitation silica
7) silica gel The following offers examples of what influence the water content of a heat insulation body has on the thermal conductivity. The measurement is performed according to the absolute one-plate method with protective ring technology according to Kohlrausch at 23° C.

1. FK 500 LS-Influence of the Moisture Content on the Thermal Conductivity
    Pressing density: 200 g/l
    Moisture content set with microwave.

| Moisture content* (%) | Thermal conductivity (mW/m/K) | Internal pressure** (mbars) |
|---|---|---|
| 0.3 | 8.8 | <4 |
| 0.5 | 8.9 | <4 |
| 1.3 | 9.4 | <4 |
| 2.3 | 9.1 | <4 |
| 4.1 | 9.4 | <4 |
| 7.0 | 11.0 | ca. 10 |

-continued

| Moisture content* (%) | Thermal conductivity (mW/m/K) | Internal pressure** (mbars) |
|---|---|---|
| 9.6 | 14.0 | ca .20 |

Figure 1:
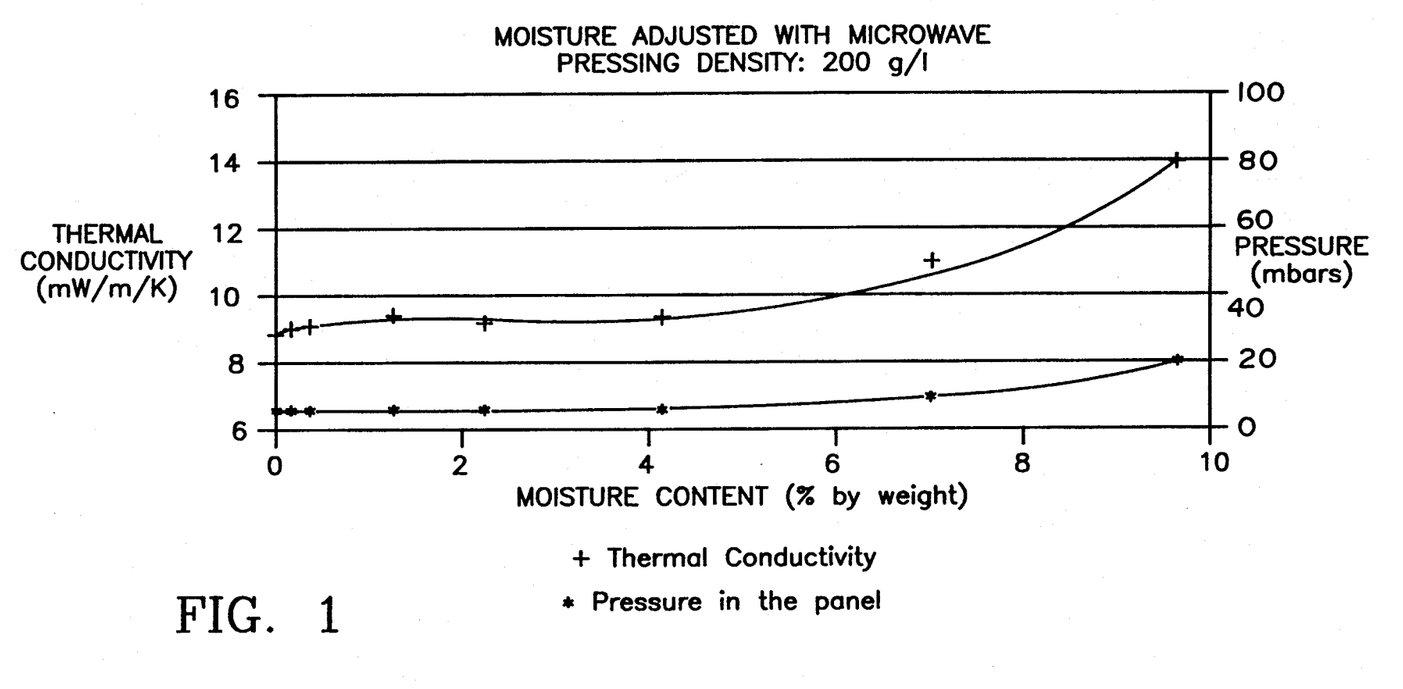
FIGS. 1–4 are graphs giving physical properties of silicon dioxide.

*Moisture content in % by weight relative to the dry substance
**Internal pressure (pressure in the heat insulation body) measured in each instance after the measurement of thermal conductivity These results are shown graphically in FIG. 1.

2. FK 500 LS-Influence of the Moisture Content on the Thermal Conductivity
    Pressing density: 200 g/l
    Adjustment of the moisture content by means of drying in a forced-air drying oven (105°–110° C.)

| Moisture content* (%) | Thermal conductivity (mW/m/K) | Internal pressure** (mbars) |
| --- | --- | --- |
| 0 | 9.5 | <4 |
| 0.2 | 10.0 | <4 |
| 0.5 | 10.5 | <4 |
| 0.8 | 9.7 | <4 |
| 1.0 | 10.0 | <4 |
| 1.1 | 10.3 | <4 |
| 2.1 | 9.7 | <4 |
| 3.6 | 10.7 | <4 |
| 4.0 | 9.8 | <4 |
| 5.1 | 10.6 | <4 |
| 7.0 | 11.0 | ca. 10 |
| 9.6 | 14.0 | ca. 20 |

Figure 2:
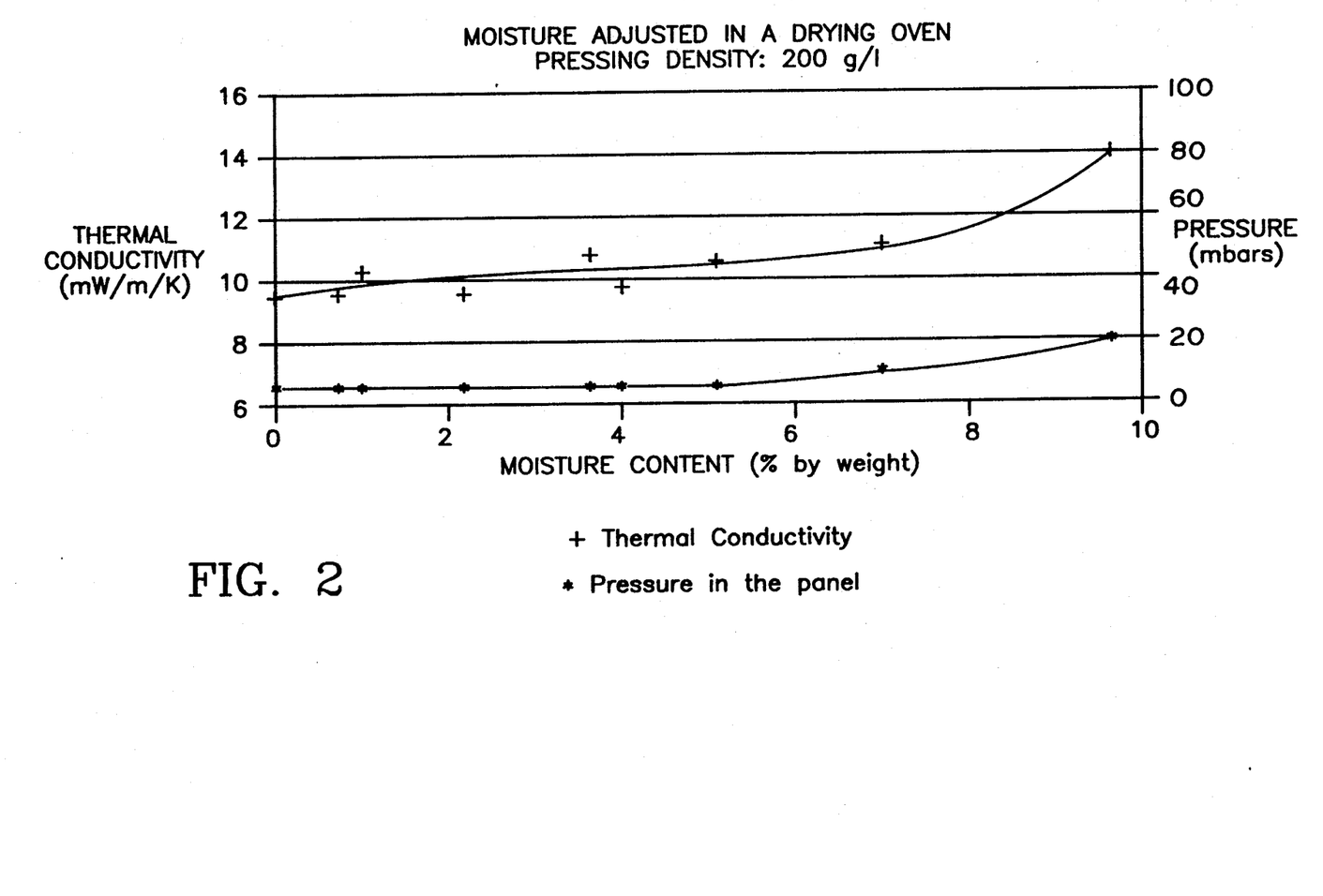

*Moisture content in % by weight relative to the dry substance
**Internal pressure (pressure in the heat insulation body) measured in each instance after the measurement of thermal conductivity These results are shown graphically in FIG. 2.

3. FK 320 DS-Influence of the Moisture Content on the Thermal Conductivity

Pressing density: 210 g/l

Adjustment of the moisture content by means of drying in a forced-air drying oven (105°–110° C.)

| Moisture content* (%) | Thermal conductivity (mW/m/K) | Internal pressure** (mbars) |
| --- | --- | --- |
| 0 | 8.6 | <4 |
| 0.6 | 9.1 | <4 |
| 1.5 | 9.2 | <4 |
| 2.5 | 9.5 | <4 |
| 3.4 | 9.3 | <4 |
| 4.5 | 9.7 | ca. 8 |
| 5.5 | 9.7 | ca. 10 |
| 7.4 | 10.8 | ca. 15 |

Figure 3:
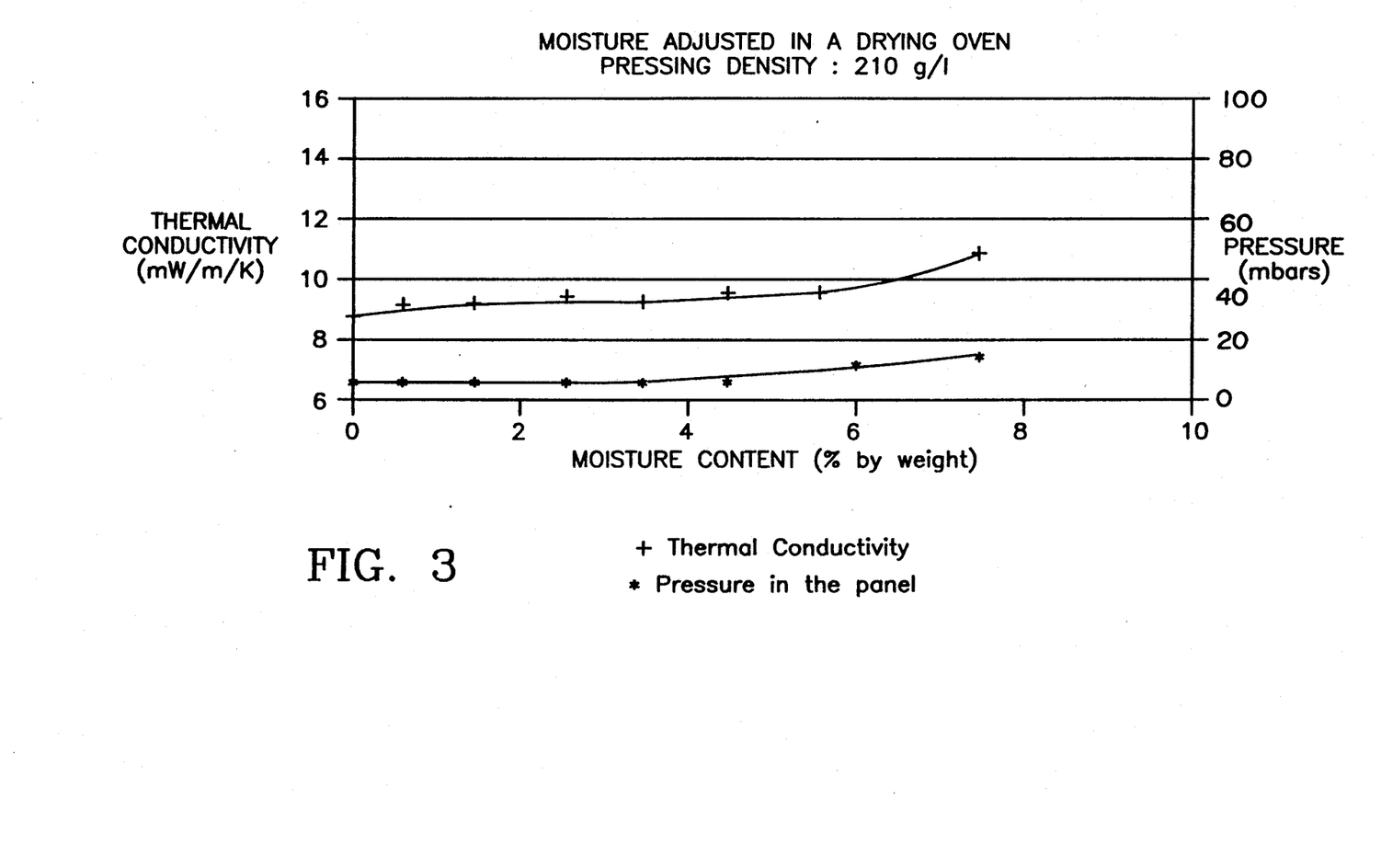

*Moisture content in % by weight relative to the dry substance
**Internal pressure (pressure in the heat insulation body) measured in each instance after the measurement of thermal conductivity These results are shown graphically in FIG. 3.

Since the inner pressure in the heat insulation shaped article gradually rises as a consequence of gases diffusing in (the sum of the gas permeabilities of the casing film is in a range between 0 to 0.5 cm$^3$/(m$^2$ d bar), examples are given to show the influence of the pressure in the shaped article (casing with asymmetric design) on the heat conductivity of the insulating body.

4. FK 500 LS

Influence of the pressure on the heat conductivity (casing with asymmetric design)

Compressed density: 200 g/l

| Inner pressure (mbars) | Heat conductivity (mW/(m K)) |
| --- | --- |
| 2 | 8.1 |
| 5 | 8.2 |
| 10 | 9.2 |
| 20 | 10.1 |
| 50 | 12.9 |
| 100 | 16.1 |
| 200 | 25.8 |
| 450 | 30.8 |
| 1000 | 30.8 |

Figure 4:
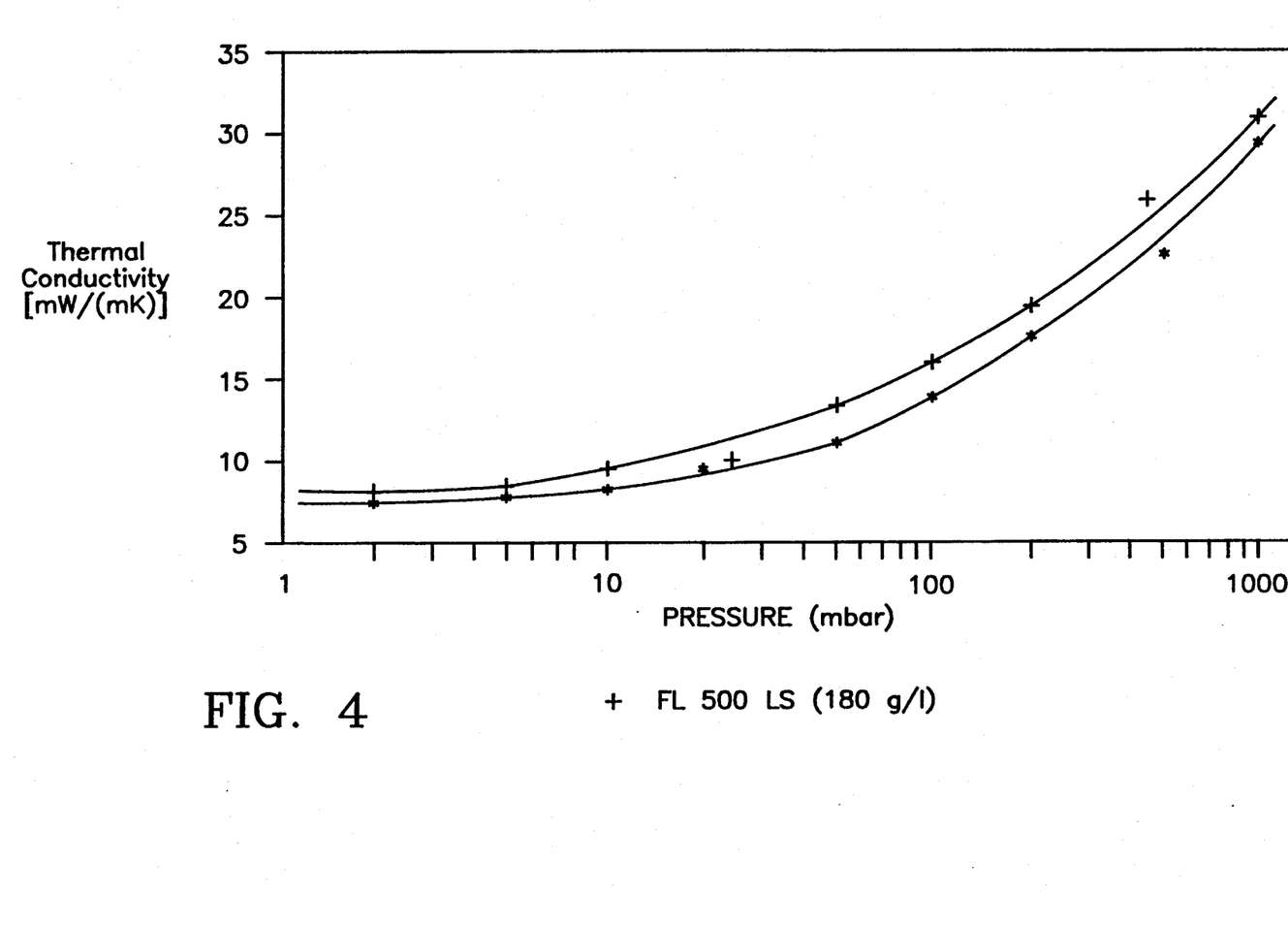
Figure 5:
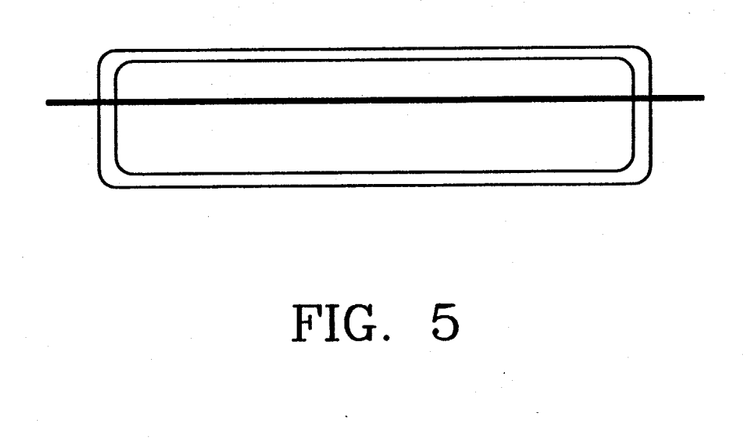
FIG. 5 is a schematic view, partially in cross-section of an embodiment of the heat insulator of the invention in which both the top and bottom elements are concave.
Figure 6:
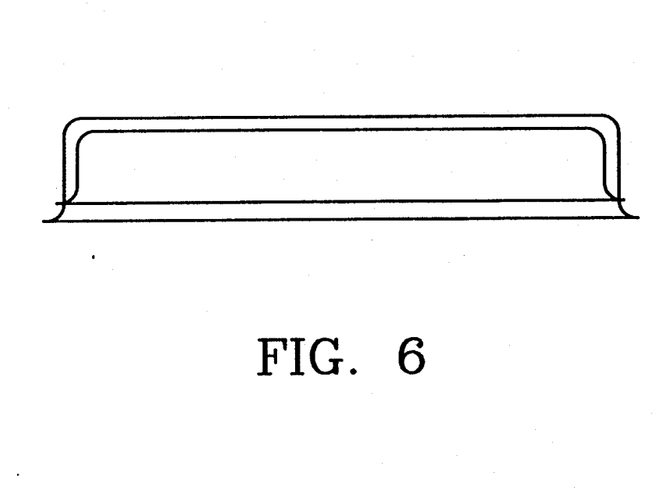
FIG. 6 is a schematic view, partially in cross-section of an embodiment of the heat insulator of the invention in which the top element is planar and the bottom element is concave.

The results are graphically shown in FIG. 4.

5. FK 320 DA

Influence of the pressure on the heat conductivity (casing with asymmetric design)

Compressed density: 210 g/l

| Inner pressure (mbars) | Heat conductivity (mW/m/K) |
| --- | --- |
| 2 | 7.2 |
| 5 | 7.9 |
| 10 | 8.0 |
| 20 | 9.3 |
| 50 | 11.1 |
| 100 | 13.8 |
| 200 | 17.6 |
| 500 | 22.5 |
| 1000 | 29.5 |

The results are graphically shown in FIG. 4.

Examples for the Calculation of the Service Life of Heat Insulation Bodies

The limiting value for the absorption of water can be determined from the graphic presentation of the dependency of thermal conductivity on the moisture content of the particular filler.

Heat insulation bodies with silica as filler and with a moisture content corresponding to the limiting value still exhibit good insulating properties. In the case of a higher moisture content, both the thermal conductivity as well as the internal pressure (pressure in the heat insulation body) increase. The result is a gradual deterioration of the insulation properties.

The moisture contents for silicas FK 500 LS and FK 320 DS can be determined from FIGS. 1, 2 and 3 which contents are permissible if the thermal conductivities of the heat insulators may deteriorate by a maximum of 25% with the absorption of water. Silicas are used for this which were dried according to DIN (German Industrial Standard) 55 921.

Results:

| FK 500 LS | limiting value: moisture content 7% |
| --- | --- |
| DK 320 DS | limiting value: moisture content 6% |

IN the case of an originally known weighted-in quantity of silica and known dimensions of the heat insulation body, these limiting values (maximum admissible amount of water) are calculated according to the equation:

$$\text{maximum amount of water (g)} = \frac{\text{limiting value (\%)}}{100\,(\%)} \times \text{silica mass}$$

1. FK 500 LS — limiting value: moisture content 7%
 a) Pressing density: 180 g/l (dimensions 80 × 60 × 2 cm)
 volume: 9.6 l
 silica mass: 1728 g
 max. amount of water: 120.96 g
 b) Pressing density: 200 g/l (dimensions 80 × 60 × 2 cm)
 volume: 9.6 l
 silica mass: 1920 g
 max. amount of water: 134.4 g 2. FK 320 DS — limiting value: moisture content 6%
 a) Pressing density: 200 g/l (dimensions 80 × 60 × 2 cm)
 volume: 9.6 l
 silica mass: 1920 g
 max. amount of water: 115.2 g
 b) Pressing density: 220 g/l (dimensions 80 × 60 × 2 cm)
 volume: 9.6 l
 silica mass: 2112 g
 max. amount of water: 126.72 g -continued maximum amount of water (g) =

$$\frac{\text{limiting value (\%)}}{100\ (\%)} \times \text{silica mass}$$

3. FK 500 LS limiting value: moisture content 7% (for casing with asymmetric design)

a) Pressing density: 180 g/l (dimensions 100 × 50 × 2 cm)
volume: 10 l
silica mass: 1800 g
max. amount of water: 126 g b) Pressing density: 200 g/l (dimensions 100 × 50 × 2 cm)
volume: 10 l
silica mass: 2000 g
max. amount of water: 140 g 4. FK 320 DS limiting value: moisture content 6% (for casing with asymmetric design)

a) Pressing density: 200 g/l (dimensions 100 × 50 × 2 cm)
volume: 10 l
silica mass: 2000 g
max. amount of water: 120 g b) Pressing density: 220 g/l (dimensions 100 × 50 × 2 cm)
volume: 10 l
silica mass: 2200 g
max. amount of water: 132 g The service life of heat insulation bodies can be estimated with the aid of the following equation in the case of known film water vapor permeability from the limiting value:

$$\text{Service life} = \frac{\text{limiting value (maximum amount of water)}}{\text{exchange area} \times \text{water vapor permeability}}$$

Dimensions:

Limiting value (maximum amount of water): (g)
Exchange surface: (m$^2$)
Water vapor permeability: g/(m$^2\cdot$d)
Service life: (d)

The following service life is calculated e.g. for a heat insulation body produced using FK 500 LS with a casing film with the water vapor permeability of 0.3 g/m$^2$.d:

Fillers: FK 500 LS
Pressing density: 180 g/l
Dimensions: 100 cm × 50 cm × 2 cm
Limiting value (moisture content): 7% by weight (= 126 g)
Maximum amount of water: 126 g
Exchange surface: 1.06 m$^2$
Water vapor permeability: 0.3 g/m$^2$/d $$\text{Service life} = \frac{126\ \text{g} \cdot \text{m}^2 \cdot \text{d}}{1.06\ \text{m}^2 * 0.3\ \text{g}} = 396\ \text{days}$$

Examples are collated in the following table to show what service life can be achieved with commercially available films (with low water vapor permeabilities) for heat insulation bodies with the precipitation silicas FK 500 LS and FK 320 DS.

| Service life of heat insulation bodies as a function of the water vapor permeabilities of different foils | | | |
|---|---|---|---|
| FK 500 LS: maximum admissible moisture content 7% Dimensions: 100 cm × 50 cm × 2 cm | | | |
| FK 320 DS: maximum admissible moisture content 6% Exchange surface: 1.06 m$^2$ | | | |
| Foil types | Water vapor permeability (g/m$^2$/Tag) | Service life FK 500 LS 180 g/l | Service life FK 500 LS 200 g/l | Service life FK 320 DS 200 g/l |
| Firm of Wolff-Walsrode: Combitherm XX 8/12 K 12 50 Vinyl-based foil, biaxially stretched, painted on both sides with PVDC/polyethylene | 0.4 | 297 days | 330 days | 283 days |
| Dow Chemical Company: Saranex foil Coextruded barrier foil XZ 86 141.00 | 0.1 | 3.3 years | 3.6 years | 3.1 years |
| 4 P packagings Ronsberg: PVDC-coated plastics PVC/PE/PVDC PVC/PVDE/PE PVC/PVDC | 0.15 | 2.2 years | 2.4 years | 2.1 years |

*measured at 23° C. and 85% relative atmospheric humidity

The following service life is calculated e.g. for a heat insulation body produced using FK 500 LS with a casing foil with a water vapor permeability of 0.05 g/m$^2$.d at 23° C. and 85% relative humidity:

Filler: FK 500 LS
Pressing Density: 180 g/l
Dimensions: 100 cm × 50 cm × 2 cm
Limiting value (moisture content): 7% by weight (= 126 g)
Maximum amount of water: 126 g
Exchange surface: 1.06 m$^2$
Water vapor permeability: 0.5 g/m$^2$/d $$\text{Service life} = \frac{126\text{g} \cdot \text{m}^2 \cdot \text{d}}{1.06\ \text{m}^2 \cdot 0.05\ \text{g}} = 2377\ \text{days} = 6.5\ \text{years}$$

at 23° C., 85% relative humidity.

Examples are provided in the following table to show the service life which can be achieved in the case of metal-free and metallic covers with known foils (with low water vapor permeabilities) for heat insulation bodies with the precipitated silicas FK 500 LS and FK 320 DS. These calculations apply at first to ah eat insulation body with asymmetrically designed casing. If a metallic and plane cover is used, the following composition results:

Maximum amount of water: 126 g
Exchange area:
trough: 0.56 m$^2$
cover: 0.50 m$^2$ -continued

| Water vapor permeability: | |
|---|---|
| trough: | 0.05 g/m²/d |
| cover: | 0 g/m²/d |

Service life =

$$\frac{126 \text{ m}^2}{0.56 \text{ m}^2 \cdot 0.05 \text{ g} + 0.5 \text{ m}^2 \cdot 0 \text{ g}} = 4500 \text{ days} = 12.5 \text{ years}$$

Service life of heat insulation bodies as a function of the water vapor permeabilities of different foils FK 500 LS: maximum permissible moisture content 7%  Dimensions: 100 cm × 50 cm × 2 cm
FK 320 DS: maximum permissible moisture content 6%  Exchange surface: 1.06 m²

| Foil types | Water Vapor Permeability (g/m²/day) | Service Life FK 500 LS 180 g/l | | Service Life FK 500 LS 200 g/l | | Service Life FK 320 DS 200 g/l | |
|---|---|---|---|---|---|---|---|
| | | metal-free | metallic | metal-free | metallic | metal-free | metallic |
| Firm of Wolff-Welsrode Combitherm XX 8/12 K 12 50 Vinyl-based foil, biaxially stretched, painted on both sides with PVDC/polyethylene | 0.4 | 297 days | 563 days | 330 days | 625 days | 283 days | 536 days |
| 4 P packagings Ronsberg: PVDC-coated plastics PVC/PE/PVDC PVC/PVDE/PE PVC/PVDC | 0.15 | 2.2 yrs | 4.2 yrs. | 2.4 yrs. | 4.6 yrs. | 2.1 yrs. | 4.0 yrs. |
| Foil according to the Example | 0.05 | 6.5 yrs. | 12.5 yrs. | 7.2 yrs. | 13.8 yrs. | 6.2 yrs. | 12.0 yrs |

*measured at 23° C. and 85% relative atmospheric humidity

Further variations and modifications of the invention will become apparent to those skilled in the art from the foregoing and are intended to be encompassed by the claims appended hereto.

German priority documents P 40 19 870.7 (filed on Jun. 22, 1990) and P 39 15 170.0 (filed on May 10, 1989) are incorporated by reference in their entirety.

What is claimed:

1. A shaped insulation body, produced from
   (a) a finely distributed, powdery or fibrous substance with a water absorption capacity of 4 to 50% by weight at 23° C. and 85° C. relative humidity,
   (b) a metal-free casing which encases said finely distributed, powdery or fibrous substance and exhibits a water-vapor permeability of 0.1 to 0.5 g/(m².d) at 23° C. and 85% relative humidity and gas permeabilities of 0.1 to 0.5 cm³/(m².d.bar) at 23° C., with the property of absorbing water up to an amount of 2 to 15% by weight without its thermal conductivity deteriorating more than 25% thereby.

2. The shaped insulation body according to claim 1, wherein the powdery or fibrous substance was dried in a microporous casing.

3. The shaped insulation body according to claim 2, wherein the microporous casing was placed into the metal-free casing.

4. The shaped insulation body according to claim 1 in the form of a plate.

5. A method of producing a shaped insulation body according to claim 1, comprising:
   (a) optionally drying a finely distributed, powdery or fibrous substance exhibiting a water absorption capacity of 4 to 50% by weight at 23° C. and 85% relative humidity under conditions which suffice for expelling the surface water,
   (b) optionally pressing the powdery or fibrous substance,
   (c) bringing the optionally dried and optionally pressed powdery or fibrous substance into a metal-free casing exhibiting an opening for evacuation and a water-vapor permeability of 0.1 to 0.5 g/(m².d) at 23° C. and 85% relative humidity and gas permeabilities of 0.1 to 0.5 cm³/(m².d.bar) (at 23° C.),
   (d) evacuating the metal-free casing, and
   (e) sealing the evacuation opening of the metal-free casing while retaining the vacuum in the interior of the casing.

6. The method according to claim 5, further comprising drying the powdery or fibrous substance in a microporous casing.

7. The method according to claim 5, further comprising pressing the powdery or fibrous substance in a microporous casing and optionally drying thereafter.

8. A storage, packaging, transport, or packaging and transport container made with the body according to claim 1.

9. A method of producing a shaped insulation body according to claim 1, comprising:
   (a) providing a finely distributed, powdery or fibrous substance exhibiting a water absorption capacity of 4 to 50% by weight at 23° C. and 85% relative humidity under conditions which suffice for expelling the surface water,
   (b) optionally pressing the powdery or fibrous substance,
   (c) bringing the dried powdery or fibrous substance into a metal-free casing exhibiting an opening for evacuation and a water-vapor permeability of 0.1 to 0.5 g/(m².d) at 23° C. and 85% relative humidity and gas permeabilities of 0.1 to 0.5 cm³/(m².d.bar) (at 23° C.),
   (d) evacuating the metal-free casing, and
   (e) sealing the evacuation opening of the metal-free casing while retaining the vacuum in the interior of the casing.

10. The method according to claim 9, where the powdery or fibrous substance is pressed prior to bringing into said casing.

11. A shaped article for use as heat insulation, produced from:

(a) a finely distributed, powdery or fibrous substance with a water absorption capacity of 4 to 50% by weight at 23° C. and 85% relative humidity, (b) a casing of two parts with asymmetric design which contains this finely distributed, powdery or fibrous substance, the first part of the casing being metal-free and concave in such a manner that it is completely filled by said finely distributed, powdery or fibrous substance and the second part being metal-free or metallic and planar and connected to the first part in such a manner that a gastight and water-vapor-tight seal is assured, both parts having water-vapor permeabilities between 0 and 0.2 $g/m^2d$ at 23° C. and 85% relative humidity and gas permeabilities for $N_2$, $O_2$ and $CO_2$ of, in sum, 0 to 0.5 $cm^3/m^2/d/bar$ at 23° C., said first part of said casing comprising a multilayer foil having the following layers in succession: linear polyethylene, adhesive agent, ethylene-vinyl alcohol copolymerizate, adhesive agent, and polyvinylidene chloride, the shaped article having the property of absorbing water up to an amount of 2 to 15% by weight without its thermal conductivity deteriorating more than 25%.

12. The shaped article according to claim 11 which is plated-shaped.

13. The shaped article according to claim 11 in which the powdery or fibrous substance has been dried in a microporous casing.

14. The shaped article according to claim 13 in which the microporous casing has been placed into the two-part metal-free casing with asymmetric design.

15. A method of producing a shaped article for heat insulation according to claim 1, said method comprising:

(a) optionally drying a finely distributed, powdery or fibrous substance exhibiting a water absorption capacity of 4 to 50% by weight at 23° C. and 85% relative humidity under conditions which suffice for expelling the surface water, (b) optionally pressing the powdery or fibrous substance into a mold, for which a press mold can optionally be used, (c) bringing the optionally dried and optionally pressed powdery or fibrous substance into the concave metal-free part of the casing, which exhibits a water-vapor permeability 0.02 to 0.2 $g/m^2/d$ at 23° C. and 85% relative humidity and gas permeabilities for $N_{25}$, $O_2$ and $CO_2$ of in sum 0.05 to 0.5 $cm^3/m^2/d/bar$ at 23° C., said concave metal-free part of said casing comprising a multilayer foil having the following layers in succession: linear polyethylene, adhesive agent, ethylene-vinyl alcohol copolymerizate, adhesive agent, and polyvinylidene chloride, (d) evacuating the optionally dried and optionally pressed powdery or fibrous substance in the concave (deep-drawn) part of the casing to a pressure between 0.1 and 1 mbar, (e) connecting the second metal-free or metallic and plane part of the casing, which exhibits a water-vapor permeability of 0 to 0.2 $g/m^2/d$ at 23° C. and 85% relative humidity and gas permeabilities for $N_2$, $O_2$ and $CO_2$ of in sum 0 to 0.5 $cm^3/m^2/d/bar$ at 23° C., in a vacuum to the first metal-free casing part in such a manner that the vacuum remains preserved in the interior of the casing and a closure is produced which is gastight and water-vapor-tight to the extent possible.

16. The method according to claim 15 in which the powdery or fibrous substance is dried in a microporous casing.

17. The method according to claim 15 in which the powdery or fibrous substance is pressed in a microporous casing and optionally dried thereafter.

18. A storage, packaging, transport, or packaging and transport container for temperature-sensitive items comprising the shaped article of claim 11.

19. A refrigerator or a freezer comprising at least one of the shaped articles according to claim 11.

* * * * *

UNITED STATES PATENT AND TRADEMARK OFFICE
CERTIFICATE OF CORRECTION

PATENT NO. : 5,316,816
DATED : May 31, 1994
INVENTOR(S) : SEXTL et al.

It is certified that error appears in the above-indentified patent and that said Letters Patent is hereby corrected as shown below:

```
On the title page:
[63] Please insert after the first occurrence of "abandoned,"
     --which is a continuation of Ser. No. 520,215, May 8, 1990,
     abandoned,--

In column 1, line 9, after "abandoned", insert --, which is a
     continuation of Ser. No. 520,215, May 8, 1990, now abandoned--
```

Signed and Sealed this

Fourteenth Day of November, 1995

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,316,816

DATED : May 31, 1994

INVENTOR(S) : Gerhard Sexlt, et al

It is certified that error appears in the above-identified patent and that said Letters Patent is hereby corrected as shown below:

On the title page; should read
[30] May 10, 1989 [DE] Fed. Rep. of Germany 3915170

Signed and Sealed this

Seventh Day of May, 1996

Attest:

BRUCE LEHMAN

Attesting Officer  Commissioner of Patents and Trademarks